Patented June 9, 1931

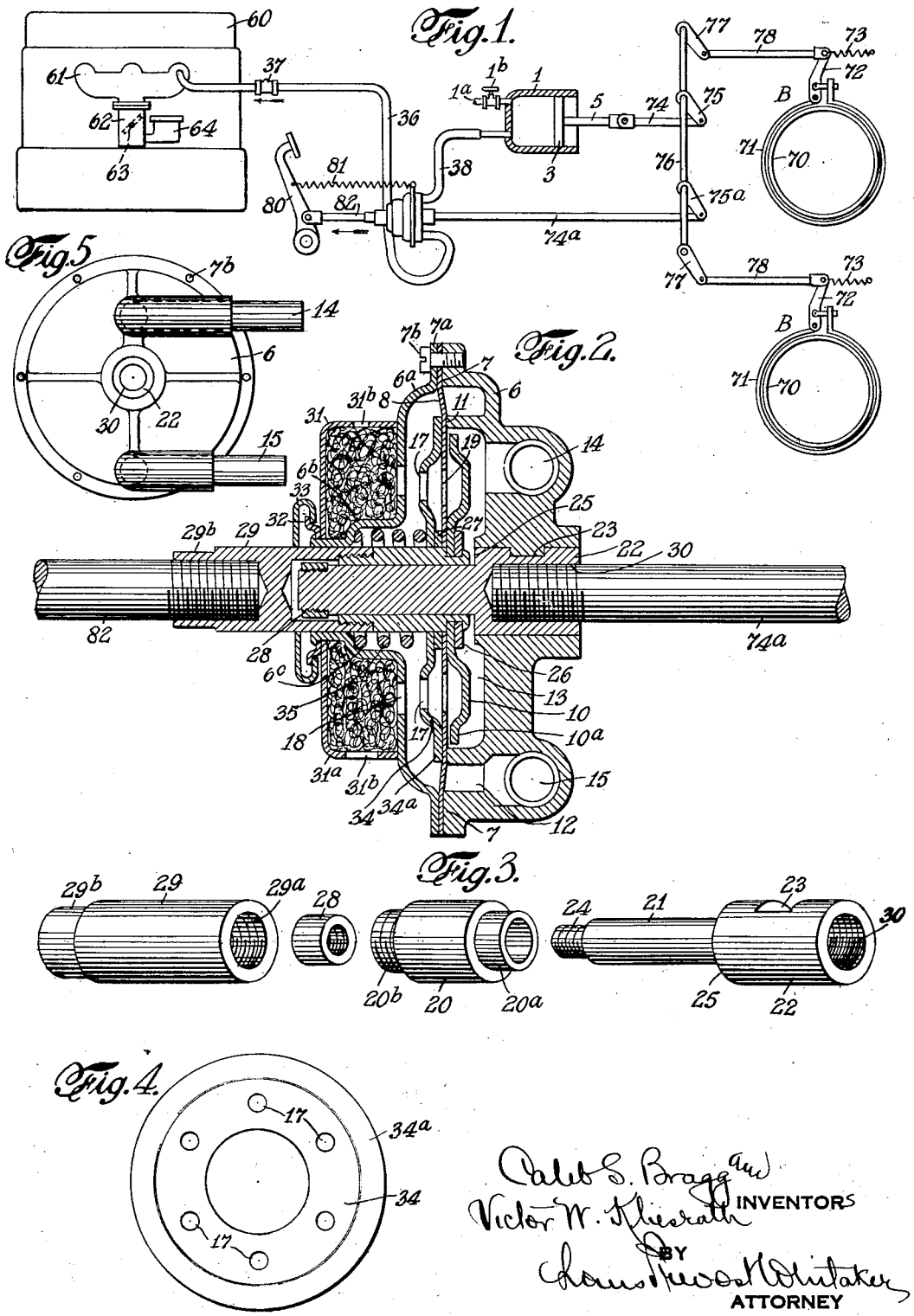

1,809,015

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

CONTROLLING VALVE MECHANISM FOR VACUUM BRAKE SYSTEMS

Application filed September 12, 1929. Serial No. 392,003.

Our invention consists in the novel features hereinafter described, reference being had to the accompanying drawings which illustrate one embodiment of the invention selected by us for purposes of illustration, and the said invention is fully disclosed in the following description and claims.

Our present invention is an improvement in controlling valve mechanism for vacuum brakes of the kind illustrated in our former application for Letters Patent of the United States filed November 7, 1927, and given Serial No. 231,724.

Our improved valve mechanism is adapted to be inserted in and supported by the rodding or linkage between the brake pedal, or other physically operable part, and brake mechanism of the vehicle to which the physical force of the operator may be applied at any time, by taking up a limited amount of lost motion between the valve casing and a valve actuating part. One of the objects of our present invention is to provide a construction in which the parts to which the brake rods are connected and the parts limiting the lost motion with respect thereto are made of steel or other metal of high tensile strength, while the valve casing and connected parts may be made of lighter material, thus greatly reducing the weight of the valve mechanism. This is decidedly advantageous, as the valve is entirely supported by the rodding to which it is connected.

Another object of our invention is to provide means for positively insuring the seating of the diaphragm valve, so as to close communication between the brake cylinder or cylinders and the source of suction, i. e., the suction passage of the internal combustion engine which propels the vehicle or vehicles, when the valve mechanism is in the released position regardless of whether a partial vacuum exists in the suction passage or not, thus assisting in the starting of the motor by preventing the admission of air from the atmosphere into the suction passage of the engine when no material degree of vacuum exists in the suction passage, as is the case in starting the engine due to the low cranking speed. Our present invention also comprises the novel features of construction and combination of parts hereinafter described and particularly pointed out in the claims, whereby the construction of the valve is simplified and the cost of manufacture greatly reduced.

Referring to the accompanying drawings which illustrates one embodiment of our invention selected by us for purposes of illustration, Fig. 1 is a diagrammatic representation of a brake system for automotive vehicles showing our improved valve mechanism embodied therein.

Fig. 2 is an enlarged sectional view of the valve mechanism.

Fig. 3 is a perspective view illustrating the parts of the valve mechanism which are connected with the brake rodding and provide a limited amount of lost motion between the valve casing and valve, showing them in separated relation.

Fig. 4 is a detail elevation of the part for insuring the seating of the diaphragm in the released position of the valve mechanism.

Fig. 5 is a rear elevation of the valve mechanism drawn to a smaller scale.

In the form of valve illustrated for example in our former application above referred to, the physical strength of the operator when applied to the brake mechanism to which the brake pedal or other operator operated part is connected was transmitted through the valve casing itself to which one section of the brake rodding was connected. This necessitated making the valve casing parts much heavier and stronger than would otherwise be necessary for the functioning of the valve mechanism itself.

In carrying out our present invention, the main body of the valve casing, which is indicated at 6, is formed as a casting, which for the sake of lightness is preferably made of aluminum. This casting is provided with a centrally located guiding stem, 21, of steel or other metal of high tensile strength, projecting from the inner face of the casting, 6, and rigidly connected therewith by means of an integral hub or boss, 22, which extends through the casting to the exterior face thereof. In practice we prefer to provide the hub portion, 22, with recessed portions, as indicated at 23, and to pour the casting, 6, around the hub portion, 22, in the mold, so as to permanently unite the parts. The guiding stem, 21, is provided at its inner end with a threaded portion, 24, of reduced diameter, and forms an annular shoulder, 25, at its intersection with the hub, 22. The main body or casting, 6, is provided with an exterior annular wall having an annular clamping face, 7, and is also provided with an annular seat, indicated at 11, dividing the interior of the casting into an annular suction chamber, indicated at 12, and a central chamber, 13. The suction passage communicates with a hollow boss, 15, adapted to receive a pipe connection to the suction passage of the engine, (or other source of suction), and the chamber, 13, communicates with a hollow boss, 14, adapted to be connected with the cylinder of the actuator or actuators which the valve mechanism controls. 8 represents a flexible diaphragm valve having its marginal edges clamped against the annular face, 7, of the casting, 6, and being adapted to seat upon the annular seat, 11, in the released position of the parts.

10 represents a disc valve located within the chamber, 13, having an annular seat, 10ª, normally separated from the diaphragm in the released position of the parts, but adapted to seat thereon within the seat, 11, and to thus close off communication with the atmosphere through apertures, 19, in the diaphragm. The central portions of the diaphragm and disc valve are connected with a valve actuating part movable with respect to the valve casing, and in this instance we provide for this purpose a sleeve, 20, also composed of steel or other metal of high tensile strength, adapted to slide upon the guiding stem, 21, and provided at its inner end with a reduced portion, 20ª, and at its outer portion with a reduced exteriorly threaded portion, 20ᵇ.

We find it convenient to assemble the valve parts in relation to the sleeve, 20, before attaching the marginal portions of the diaphragm, and to this end the disc valve, 10, is formed with a central aperture fitting the reduced portion, 20ª, of the sleeve, a washer, 26, being preferably placed on said reduced portion after the disc valve is in position, and the disc valve is rigidly connected with the sleeve preferably by swaging over or heading the reduced portion, 20ª, as shown. The central portion of the diaphragm is secured positively to the sleeve, 20, and in this instance the diaphragm is provided with an aperture fitting the portion of the sleeve of greater diameter, which also receives a washer, indicated at 27, on the outer face of the diaphragm, holding the central portion of the diaphragm firmly against the disc valve. After assembling these parts, the valve actuating sleeve, 20, is slipped over the guiding stem, 21, and the marginal portions of the diaphragm are clamped to the annular face, 7, of the casting, 6. A stop collar, indicated at 28, is screwed on the threaded end, 24, of the stem, 21, and the stem, 21, is of sufficient length to permit a limited amount of longitudinal movement of the sleeve, 20, thereon, which is limited in one direction by the shoulder, 25, of the hub, 22, and in the other direction by the stop collar. 29 represents a coupling member, also formed of steel or other metal of high tensile strength, having a counterbored and interiorly threaded portion, 29ª, at one end, for engaging the threaded portion, 20ᵇ, of the sleeve, 20, and an interiorly threaded portion, 29ᵇ, at the other end for engaging one of the connecting rods, for example the rod, 82, connected with the brake pedal, as hereinafter described. The hub, 22, of the guiding stem, 21, is also provided with an interiorly threaded portion, 30, to receive a connecting rod, in this instance indicated at 74ª, operatively connected with brake mechanism of the vehicle, so that the connections between the brake rods (82 and 74ª) when the lost motion between the diaphragm and disc valves and the main body, 6, of the valve casing is taken up, by bringing the sleeve, 20, into engagement with the stop collar, 28, to permit the operator to apply physical force to the brake mechanism, is transmitted entirely through the coupling member, 29, sleeve, 20, guiding stem, 21, and hub, 22, all of which are composed of steel or other metal of high tensile strength, and as strong as or stronger than the rodding, 82 and 74ª This relieves the valve casing itself entirely from strain under such conditions.

While the apparatus as thus far described will be operative, we prefer to provide the valve body or casing, 6, with an enclosing casing member, 6ª, formed preferably as a stamping from sheet metal, as aluminum or other suitable metal, having an annular clamping flange, 7ª, to engage the marginal portions of the diaphragm, and secured to the casting, 6, by means of screws, 7ᵇ, as shown. The casing member, 6ª, is also provided with a hub portion, 6ᵇ, forming a recess, 6ᶜ, surrounding the sleeve, 20, and the guiding portion, 6ᵈ, engaging the exterior of the coupling member, 29, which forms in effect an extension of the sleeve, 20. The casing member, 6ª, is also provided with air inlet apertures, indicated at 18, communicating with the atmosphere. The hub portion of the casing member, 6ª, is provided preferably with a dust cover in the form of a stamped metal piece, comprising a disc portion, 31, having a central aperture fitting the guiding portion of the casing member, 6ª, and an annular flange portion, 31ª, engaging the outer face of the casing member and provided with air inlet apertures, 31ᵇ. This dust cover is conveniently held in position by a metal washer, indicated at 32, having an outwardly bent flange portion to receive a rubber dust cap, 33, having a central opening fitting the coupling member, 29. The dust cap, 31, is provided with hair or other fibrous material, to prevent dust from entering the interior of the valve casing.

We also prefer to provide the outer face of the diaphragm with a metal disc, indicated at 34, having an annular diaphragm engaging portion, 34ᵃ, opposite the annular seat, 11, and having a central aperture fitting the exterior of the sleeve, 20, for the purpose of insuring the seating of the diaphragm when the parts are in released position. This seating disc is urged in a direction toward the diaphragm, 8, and seat, 11, by yielding means, in this instance a coil spring, indicated at 35, surrounding the sleeve, 20, and bearing at one end against the outer end of the recess, 6ᵇ, in the casing member, 6ᵃ, and at the other end against the seating member or disc, 34. In this instance the spring, 35, also presses the seating member or disc, 34, against the washer, 27, and clamps the diaphragm between said washer and the central portion of the disc valve, 10. The seating member, 34, is necessarily provided with apertures, indicated at 17, which place the apertures, 19, in the diaphragm in communication with the apertures, 18, in the casing member, 6ᵃ, and are conveniently located in substantial registration therewith.

In Fig. 1 we have illustrated a conventional and simple installation of vacuum brake mechanism for automotive vehicles, in which our improved valve mechanism is embodied. In this figure 60 represents the internal combustion engine for propelling the vehicle or vehicles, provided with a suction passage including a vertical portion, 62, leading from the carburetor, 64, and the intake manifold, 61, which forms a part of the suction passage, and 63 represents the usual throttle valve interposed between the carburetor and the intake manifold. The brake mechanism of the vehicle may be of any desired type and applied to any number of wheels. In Fig. 1 we have diagrammatically indicated brake mechanisms for a pair of wheels at B, B, each comprising in this instance a brake drum, 70, brake band, 71, brake applying lever, 72, and retracting spring, 73, and the brake applying levers, 72, are shown connected by rods, 78, 78, with arms, 77, 77, on a rock shaft, 76. 1 represents the cylinder of a power actuator, in this instance closed at one end and open at the other, and 3 represents the piston in said cylinder having its piston rod, 5, connected by a link, 74, with an arm, 75, on the rock shaft, 76.

80 represents the usual brake pedal lever, and our improved valve mechanism is shown in linkage or rodding between this pedal lever and an arm, 75ᵃ, on the rock shaft, 76. In this instance the pedal lever is connected by link rod, 82, as before stated, with the coupling member, 29, and valve actuating sleeve, 20, and the hub, 22, of the guiding stem, 21, is connected by the link rod, 74ᵃ, with the arm, 75ᵃ. The pedal, 80, may be provided with the usual retracting spring, indicated in this instance at 81.

The annular suction chamber of the valve body, 6, is connected by a suction pipe, 36, with the suction passage of the engine between the throttle valve and the engine cylinders, which is conveniently accomplished by connecting the pipe, 36, with the intake manifold, 61, and the pipe, 36, is preferably provided with a check valve, 37, opening to the manifold, as indicated by the arrow adjacent thereto. The chamber, 13, of the valve body is connected by a pipe, 38, with the closed end of the cylinder, 1, of the power actuator, and as the valve mechanism moves bodily with the rodding, portions of the pipes, 36 and 38, adjacent to the valve mechanism are obviously made of flexible material.

Assuming that the parts are in released position and that the engine is not running, the valve mechanism will be in the position shown in Fig. 2, and the diaphragm will be firmly seated upon the annular seat, 11, by the seating member, 34, and the spring, 35, thus completely cutting off the actuator cylinder from the suction chamber, 12. At the same time the disc valve, 10, will be in the unseated position, thus connecting the actuator cylinder with the atmosphere through the apertures, 19, 17, 18 and 31ᵇ. When the engine is started, rarification will exist in the suction passage of the engine and the suction pipe, 36, and suction chamber, 12, of the valve mechanism will be exhausted. In the operation of the vehicle, when it is desired to apply the brakes by power, the operator will depress the pedal lever, which will cause the sleeve, 20, to move in the direction of the arrow Fig. 1, upon the valve stem, 21, so as to seat the disc valve on the diaphragm, cutting off the communication between the actuator cylinder and the atmosphere, and thereafter unseating the diaphragm from the seat, 11, so as to establish communication between the actuator cylinder and the suction chamber, 12, and as the air is exhausted from the actuator cylinder, the piston, 3, will move inwardly and apply the brakes. As the valve casing is connected with the piston through the rock shaft, 76, arm 75ᵃ, and rod, 74ᵃ, the whole valve mechanism will move forward as the piston moves, and if the operator stops the forward movement of the pedal, the slight continued forward movement of the valve casing will effect the shifting of the valve sleeve rearwardly with respect to the stem, 21, so as to reseat the diaphragm without unseating the disc valve and will hold the brakes as applied in any position up to the maximum power of the actuator. After the brakes have been applied to the maximum extent of the power of the actuator, the operator can, by depressing the pedal lever further, bring the sleeve, 20, into contact with the stop collar, 28, thus taking up the lost motion between the valve actuating sleeve and the valve casing, and the physical force of the operator may then be directly applied through the parts, 29, 20, 28, 21 and 22, and the link rods to the brake mechanism in addition to the power of the actuator without imposing any strain upon the valve casing or the valves. In like manner the brake mechanisms connected through the valve mechanism with the pedal lever may be applied by physical force alone when the engine is not running, or in case power should fail, in which case the valves would be held in position to vent the cylinder of the actuator during the application of physical force to the brakes.

When the pedal is first depressed to apply the brakes by power, the spring, 35, provides an initial resistance to be overcome by the operator (in addition to the ordinary retracting spring, 81). The spring, 81, may or may not be employed, and when employed it will ordinarily exert only sufficient retracting force to counterbalance the weight of the pedal lever. As soon as the diaphragm valve is unseated, a reduction of pressure is effected in the chamber, 13, and in the actuator cylinder, and as the forward face of the diaphragm and disc valve are exposed to atmosphere, a differential of fluid pressures is created, which is transmitted to the foot of the operator through the pedal and increases gradually as the rarification within the valve casing and the actuator cylinder increases. This requires the operator to exert a gradually increasing amount of force upon the pedal to maintain the diaphragm valve in open position, and this gradually increasing reactionary force serves to apprise the operator as to the amount of power being exerted upon the brakes by the actuator. The brakes may be applied partially and held by stopping the forward movement of the pedal lever, and further applied by a further forward movement of the pedal lever, and they may be released at any point in their application by releasing the pedal lever when the sleeve, 20, will be shifted rearwardly, so as to permit the disc valve, 10, to be unseated after the diaphragm seats, thus reconnecting the cylinder with the atmosphere and equalizing pressures on opposite faces of the piston, when the brakes and piston will be restored to their normal positions by the usual retracting springs, indicated at 73. The rearward movement of the sleeve, 20, will be effected in part by the spring, 35, assisted by the reactionary differential of fluid pressures on the diaphragm and disc valve before referred to.

When the engine is running, a differential of fluid pressures will exist on that portion of the diaphragm between the seat, 11, and the outer circular wall of the casing, which will normally tend to hold the diaphragm seated, and the seating member, 34, could therefore be dispensed with, if desired. We prefer, however, to employ it for the reason that without it the diaphragm may not sit tightly unless a vacuum exists in the suction chamber, 12, when the brake pedal is in the released position, and in starting the motor, at which time comparatively little suction exists in the manifold due to the relatively slow cranking speed of the engine, a considerable amount of air may be admitted to the manifold and interfere with the starting of the motor. The construction of the valve mechanism in the manner previously described provides that the parts thereof, which serve as connections between the physically operable part and valve mechanism of the vehicle when the physical force of the operator is applied thereto, shall be at least as strong as any other part of the rodding, and relieves the valve casing entirely from any strain under such circumstances. We can, therefore, make the valve casing of very light material, so that the casing and valves can be more readily supported by the rodding in which they are located, and the construction of the valve mechanism is greatly simplified and its cost reduced.

It will be understood that a single valve mechanism of the kind described may be employed for controlling one or a plurality of power actuators, and in Fig. 1 for example we have shown the cylinder, 1, provided at its closed end with a pipe, 1ª, for connecting it with the corresponding portion of another power actuator cylinder or cylinders, the pipe, 1ª, being shown provided with a cut-off cock, 1ᵇ, for closing it when only one cylinder is employed.

What we claim and desire to secure by Letters Patent is:—

1. In valve mechanism of the kind described, the combination with a valve body provided with an annular seat, a diaphragm for engaging said seat provided with inlet apertures for higher fluid pressure and having marginal portions in sealing engagement with the valve body, a disc valve having a seat for engaging said diaphragm and closing communication through said apertures, a valve actuating part movable with respect to the valve body and connected with said diaphragm and disc valve, said valve actuating part and said valve body being provided with means for connecting them respectively with a physically operable part and with brake mechanism, said valve body being provided with means for connecting the portions thereof exterior to and within said annular seat respectively with a source of lower fluid pressure and with a power actuator, and means independent of the valve body for limiting the lost motion between said valve actuating part and the valve body, and connecting said physically operable part with said brake mechanism.

2. In valve mechanism of the kind described, the combination with a valve body having an annular seat, and a centrally located guiding part, a diaphragm for engaging said seat provided with inlet apertures for higher fluid pressures and having marginal portions in sealing engagement with the valve body, a disc valve having a seat for engaging said diaphragm and closing communication through said aperture, a valve actuating part engaging and movable with respect to said guiding part and connected with said diaphragm and disc valve, said valve actuating part and said guiding part being provided with means for connecting them respectively with a physically operable part and with brake mechanism, said valve body being provided with means for connecting the portions thereof exterior to and within said annular seat respectively with a source of lower fluid pressure and with a power actuator, and means for limiting the lost motion between said valve actuating part and said guiding part, and connecting said physically operable part with said brake mechanism independently of the valve body.

3. In valve mechanism of the kind described, the combination with a guiding stem having a hub portion, a valve body connected with and supported by said hub portion and provided with an annular seat, a diaphragm for engaging said seat provided with inlet apertures for higher fluid pressure and having its marginal portions in sealing engagement with said body, a disc valve having a seat for engaging said diaphragm and closing communication through said aperture, said valve body being provided with means for connecting the portions exterior to and within said annular seat respectively with a source of lower fluid pressure and with a power actuator, a valve actuating sleeve on said guiding stem connected with said diaphragm and disc valve, means for connecting said sleeve and the hub portion of said stem respectively with a physically operable part and with brake mechanism, and a stop on said stem, and connecting said physically operable part and said brake mechanism independently of the valve body.

4. In valve mechanism of the kind described, the combination with a guiding stem having a hub portion, a valve body connected with and supported by said hub portion and provided with an annular seat, a diaphragm for engaging said seat provided with inlet apertures for higher fluid pressure and having its marginal portions in sealing engagement with said body, a disc valve having a seat for engaging said diaphragm and closing communication through said aperture, said valve body being provided with means for connecting the portions exterior to and within said annular seat respectively with a source of lower fluid pressure and with a power actuator, a valve actuating sleeve on said guiding stem connected with said diaphragm and disc valve, means for connecting said sleeve and the hub portion of said stem respectively with a physically operable part and with brake mechanism, a valve casing member having marginal clamping portions secured to the valve body and engaging the marginal portions of the diaphragm, and provided with higher fluid pressure apertures and a centrally located guiding portion, said sleeve having portions in guiding engagement with the guiding portions of said casing member, and a stop on said stem for limiting the lost motion between said sleeve and stem, and connecting said physically operable part and said brake mechanism independently of the valve body and said valve casing member.

5. In valve mechanism of the kind described, the combination with a guiding stem having a hub portion, a valve body formed of cast metal rigidly united to said hub portion and provided with an annular seat, a diaphragm valve for engaging said seat provided with higher fluid inlet apertures and having its marginal portions in sealing engagement with said body, a disc valve having a seat for engaging said diaphragm and closing communication through said apertures, said valve body being provided with means for connecting the portions exterior to and within said annular seat respectively with a source of lower fluid pressure and with a power actuator, a valve actuating sleeve on said guiding stem connected with said diaphragm and disc valve, said hub and said sleeve being provided with means for connecting them respectively with a physically operable part and with brake mechanism, a stamped metal casing member having marginal portions secured to said body and clamping the marginal portions of the diaphragm thereto, said casing member being provided with higher fluid pressure inlet apertures and a centrally located guiding sleeve, said valve actuating sleeve being provided with portions extending through and in engagement with said guiding sleeve, a dust receptacle supported on said guiding sleeve and enclosing the inlet apertures in said casing member, and a flexible dust cover secured to said guiding sleeve and engaging the guiding portion of said sleeve extending therethrough, and a stop on said guiding stem for limiting the lost motion between said sleeve and stem and connecting the physically operable part and said brake mechanism independently of said valve body and casing member.

6. In valve mechanism of the kind described, the combination with a guiding stem having a hub portion, a valve body formed of cast metal rigidly united to said hub portion and provided with an annular seat, a diaphragm valve for engaging said seat provided with higher fluid inlet apertures and having its marginal portions in sealing engagement with said body, a disc valve having a seat for engaging said diaphragm and closing communication through said apertures, said valve body being provided with means for connecting the portions exterior to and within said annular seat respectively with a source of lower fluid pressure and with a power actuator, a valve actuating sleeve on said guiding stem connected with said diaphragm and disc valve, said hub and said sleeve being provided with means for connecting them respectively with a physically operable part and with brake mechanism, a stamped metal casing member having marginal portions secured to said body and clamping the marginal portions of the diaphragm thereto, said casing member being provided with higher fluid pressure inlet apertures and a centrally located guiding sleeve, said valve actuating sleeve having portions extending through said guiding sleeve, a seating disc within said casing member having annular portions for engaging the diaphragm opposite to said annular seat and higher pressure inlet apertures, and a spring surrounding said sleeve and interposed between said seating disc and said casing member, and means for limiting the lost motion between said sleeve and said guiding stem to connect the physically operable part with said brake mechanism independently of the valve body and casing member.

7. In valve mechanism of the kind described, the combination with a valve body provided with an annular seat, a diaphragm for engaging said seat having marginal portions in sealing engagement with the valve body, and provided with higher fluid pressure inlet apertures, a disc valve located within said seat and provided with an annular seat for engaging said diaphragm and closing communication through said apertures therein, a seating disc on the opposite side of said diaphragm from the disc valve provided with annular portions for engaging said diaphragm and seating it upon said annular seat, and having higher fluid pressure inlet apertures communicating with those of the diaphragm, a valve actuating part movable with respect to the valve body and connected with the central portions of said disc valve, diaphragm and seating disc, and a spring interposed between said valve actuating part and parts connected with the valve body for holding the parts of the valve in released position with the diaphragm seated and the disc valve unseated, said valve body and said valve actuating part being provided with means for connecting them respectively with a physically operable part and with brake mechanism.

In testimony whereof we affix our signatures.

CALEB S. BRAGG.
VICTOR W. KLIESRATH.